United States Patent
Yang

(10) Patent No.: US 11,963,066 B2
(45) Date of Patent: Apr. 16, 2024

(54) METHOD FOR INDICATING PARKING POSITION AND VEHICLE-MOUNTED DEVICE

(71) Applicant: Mobile Drive Technology Co., Ltd., New Taipei (TW)

(72) Inventor: Cheng-Kuo Yang, New Taipei (TW)

(73) Assignee: Mobile Drive Netherlands B.V., Amsterdam (NL)

( * ) Notice: Subject to any disclaimer, the term of this patent is extended or adjusted under 35 U.S.C. 154(b) by 182 days.

(21) Appl. No.: 17/337,219

(22) Filed: Jun. 2, 2021

(65) Prior Publication Data
US 2021/0375135 A1 Dec. 2, 2021

(30) Foreign Application Priority Data
Jun. 2, 2020 (CN) .......................... 202010491033.6

(51) Int. Cl.
H04W 4/029 (2018.01)
G06V 20/56 (2022.01)
H04W 4/40 (2018.01)
H04W 4/80 (2018.01)

(52) U.S. Cl.
CPC ............ *H04W 4/029* (2018.02); *G06V 20/56* (2022.01); *H04W 4/40* (2018.02); *H04W 4/80* (2018.02)

(58) Field of Classification Search
CPC ......... H04W 4/029; H04W 4/40; G06V 20/56
See application file for complete search history.

(56) References Cited

U.S. PATENT DOCUMENTS

| | | | | |
|---|---|---|---|---|
| 6,738,712 | B1 * | 5/2004 | Hildebrant | G01C 21/26 701/484 |
| 2002/0008614 | A1 * | 1/2002 | Yeh | G08G 1/005 340/988 |
| 2009/0153362 | A1 * | 6/2009 | Goto | G08G 1/096844 340/932.2 |
| 2015/0099552 | A1 * | 4/2015 | Chen | H04W 4/029 455/457 |
| 2015/0360613 | A1 * | 12/2015 | Lee | G06V 30/224 348/148 |
| 2016/0371983 | A1 * | 12/2016 | Ronning | G08G 1/09626 |
| 2017/0092128 | A1 * | 3/2017 | Liu | G08G 1/205 |
| 2019/0204092 | A1 * | 7/2019 | Wheeler | G05D 1/0246 |
| 2019/0349716 | A1 * | 11/2019 | Liu | H04N 7/183 |
| 2020/0132473 | A1 * | 4/2020 | Shipley | G01S 13/867 |

(Continued)

FOREIGN PATENT DOCUMENTS

| | | |
|---|---|---|
| CN | 108510786 A | 9/2018 |
| CN | 109035859 A | 12/2018 |
| CN | 110246358 A | 9/2019 |

(Continued)

*Primary Examiner* — Andrew W Bee
(74) *Attorney, Agent, or Firm* — ScienBiziP, P.C.

(57) ABSTRACT

A method for indicating to a user the exact location of a parked vehicle includes obtaining a plurality of panoramic images of a vehicle when being driven using a panoramic lens. A direction of driving of the vehicle is identified based on the panoramic images and a determination as to location is made when the vehicle arrives at a parking location. When the vehicle is parked, parking position information is sent to a mobile terminal held by the driver or other user. A vehicle-mounted device for implementing the method is also disclosed.

14 Claims, 3 Drawing Sheets

(56) References Cited

U.S. PATENT DOCUMENTS

2020/0279489 A1\* 9/2020 Liu .......................... G08G 1/20
2021/0365680 A1\* 11/2021 Mossberg .............. G06Q 50/28

FOREIGN PATENT DOCUMENTS

| CN | 110431565 A | \* 11/2019 | ......... G06K 9/00664 |
| CN | 110517531 A | 11/2019 | |
| CN | 112818895 A | 5/2021 | |

\* cited by examiner

METHOD FOR INDICATING PARKING POSITION AND VEHICLE-MOUNTED DEVICE

FIELD

The subject matter herein generally relates to electronics, specifically a parking position reminding method and vehicle-mounted device.

BACKGROUND

Most indoor parking lots are underground. Every time the car owner parks his car, he needs to remember the parking space and its number, or take a photo as a basis for finding his car. However, parking lots are often large in size and complex in structure. Some car owners tend to forget the location of their car and waste a lot of time looking for a car. When taking a photo of the parking space number as the basis for finding a car, the complex structure of the parking lot often makes it difficult for car owners to find their car when it is only the parking space number that they can refer to, increasing the time for car owners to find the car, and causing great trouble to the car owner. Therefore, indoor parking lots are in urgent need of a system that enables car owners to find vehicles easily, conveniently, and quickly.

An improvement is required.

BRIEF DESCRIPTION OF THE DRAWINGS

Implementations of the present disclosure will now be described, by way of embodiments, with reference to the attached figures.

DETAILED DESCRIPTION

Figure 1:
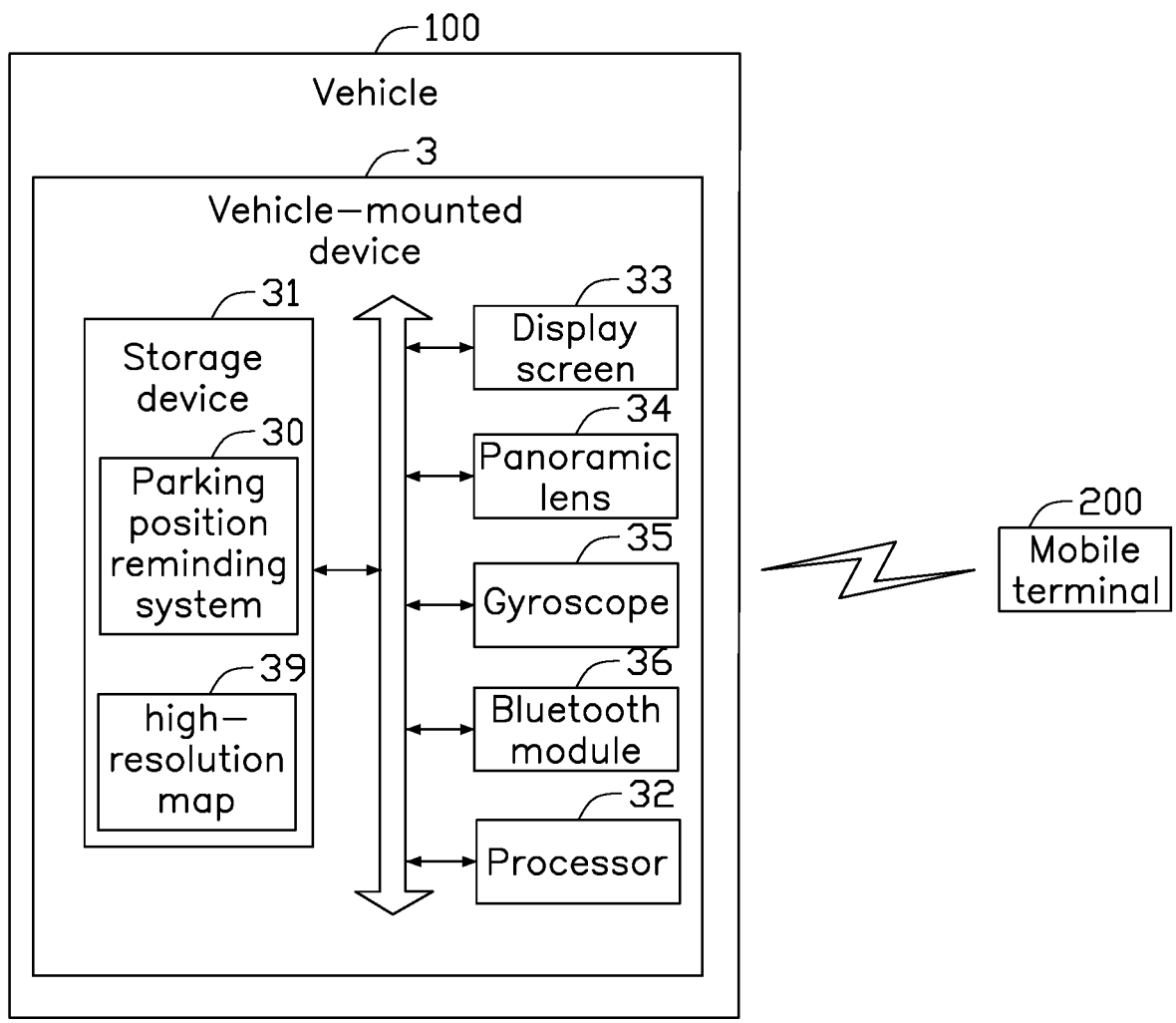
FIG. 1 is a schematic diagram of an embodiment of a vehicle-mounted device employing a method for indicating the position of a parked car.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates a vehicle-mounted device 3 in accordance with an embodiment of the present disclosure.

The vehicle-mounted device 3 can be disposed on a vehicle 100. The vehicle-mounted device 3 may function as a vehicle-mounted computer, and includes a storage device 31, at least one processor 32, a display screen 33, a panoramic lens 34, a gyroscope 35, and a BLUETOOTH module 36, all electrically connected to each other.

It should be understood that, the structure of the vehicle-mounted device 3 shown in FIG. 1 does not constitute a limitation of the present disclosure. The vehicle-mounted device 3 may also include more or less other hardware or software than FIG. 1 shows, or have a different component arrangement.

It should be noted, the vehicle-mounted device 3 is only an example. Other existing or future vehicle-mounted devices that can be adapted to the present disclosure should also be included in the protection scope of the present disclosure, and are included here by reference.

In at least one embodiment, the storage device 31 can be used to store program codes and various data of computer programs. For example, the storage device 31 may be used to store a parking position reminding system 30 and a high-resolution map 39 installed in the vehicle-mounted device 3.

In at least one embodiment, the storage device 31 may include a read-only memory (ROM), a programmable read-only memory (PROM), and an erasable programmable read-only memory (EPROM), one-time programmable read-only memory (OTPROM), electronically-erasable programmable read-only memory (EEPROM), and CD-ROM (CD-ROM) or other optical disk storage, magnetic disk storage, tape storage, or any other non-volatile computer-readable storage medium that can be used to carry or store data.

In at least one embodiment, the at least one processor 32 may be composed of an integrated circuit. For example, it can be composed of a single packaged integrated circuit, or it can be composed of multiple integrated circuits with the same function or different functions, including one or more central processing units (CPUs), microprocessors, combinations of digital processing chips, graphics processors and various control chips, etc. The at least one processor 32 is the control core of the vehicle-mounted device 3, which uses various interfaces and lines to connect the various components of the entire vehicle-mounted device 3, and executes programs or modules stored in the storage device 31 or instructions and call data stored in the storage device 31 to execute various functions of the vehicle-mounted device 3 and process data.

In at least one embodiment, the display screen 33 may be a touch screen for displaying images, for example a user interface for displaying a high-precision map 39.

In at least one embodiment, the high-precision map 39 may be Baidu high-precision map or other maps such as Google high-precision map.

In at least one embodiment, the high-precision map 39 refers to a high-precision map in electronic form. The detail stored in high-precision maps includes but is not limited to the following types:

(1) Three-dimensional information of the lane and its surrounding environment, such as fixed objects in the lane and its surrounding environment;

(2) Lane feature information, such as the number of lanes, lane type, lane width, lane slope, lane line position, connection between lanes;

(3) Information of fixed objects beside the lane, such as the type and geographic location of traffic signs, the type and geographic location of traffic lights;

(4) Infrastructure information, such as landmark buildings and their geographical locations, parking spaces types, vacant parking spaces and geographical locations;

(5) Road dynamic information, such as road congestion, road construction;

(6) Text information about the surrounding environment of the lane, such as the name, image, description, etc. of the buildings surrounding the lane.

In at least one embodiment, the panoramic lens 34 can be installed on the vehicle 100, and can obtain a panoramic image of the surroundings of the vehicle 100 when driving. The panoramic image includes the road at the current position of the vehicle and the surrounding environment, and the panoramic lens 34 may include a plurality of lenses. The plurality of lenses are arranged at different positions of the vehicle 100 to take images of the surroundings of the vehicle 100 in different orientations, and form the panoramic image through image fusion. In at least one embodiment, the gyroscope 35 is provided on the vehicle 100 and can be used to track the driving direction of the vehicle 100. The BLUETOOTH module 36 can be used to communicate with the mobile terminal 200.

Figure 3:
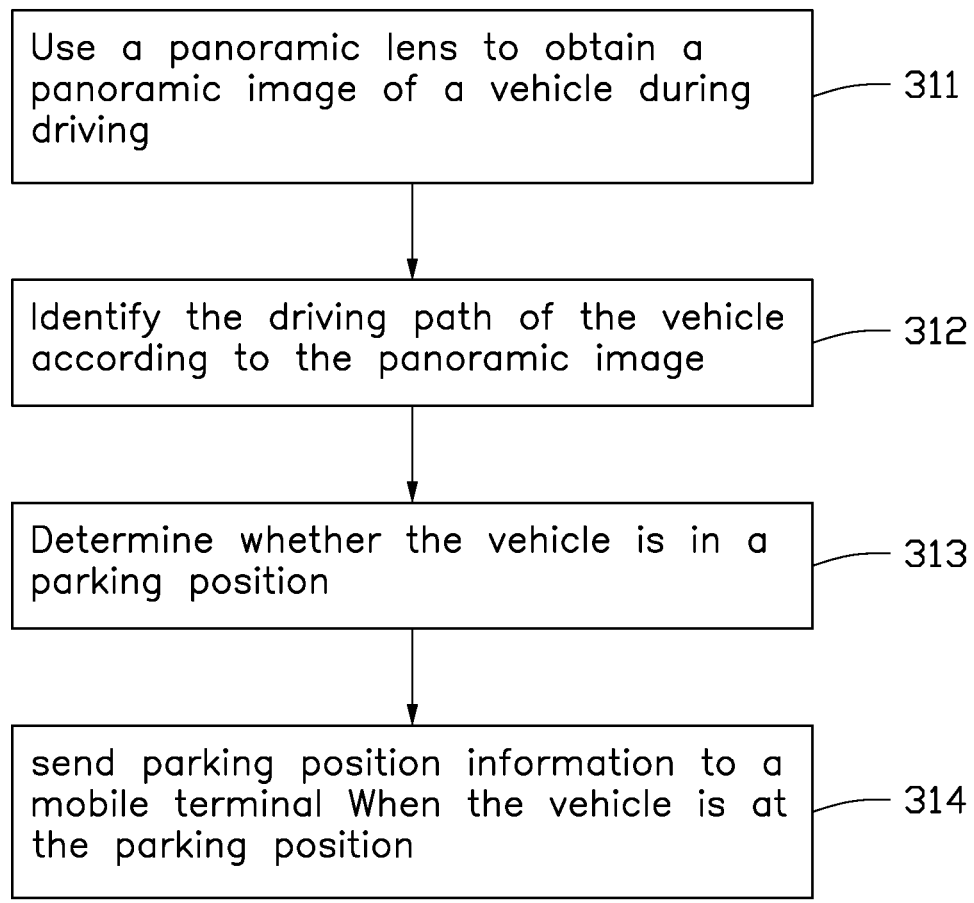
FIG. 3 is a flowchart of an embodiment of a method for indicating a parking position.

In at least one embodiment, the parking position reminding system 30 may include one or more modules, and the one or more modules are stored in the storage device 31 and executed by at least one or more processors (the processor 32 in this embodiment) to achieve the function of reminding the parking position after the vehicle has been parked (refer to the introduction of FIG. 3 for details).

Figure 2:
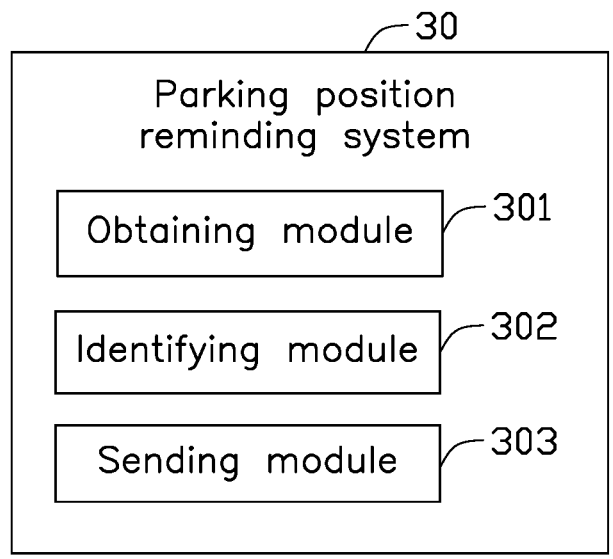
FIG. 2 is schematic diagram of an embodiment of a parking position indicator system.

In at least one embodiment, the parking position reminding system 30 can be divided into a plurality of modules according to the functions carried out. Referring to FIG. 2, the plurality of modules include an acquisition module 301, an identification module 302, and a sending module 303. The modules referred to in the present disclosure refers to a series of computer-readable instruction segments that can be executed by at least one processor (for example, the processor 32) and can complete fixed functions, and are stored in a storage device (for example, the storage device of the vehicle-mounted device 3). The functions of each module will be detailed later.

In at least one embodiment, an integrated unit implemented in the form of a software function module can be stored in a non-volatile readable storage medium. The above-mentioned software function module includes one or more computer-readable instructions, and the vehicle-mounted device 3 or a processor (processor) implements all or part of the method of each embodiment of the present disclosure by executing the computer-readable instructions. For example, the method of indicating the parking position as shown in FIG. 3.

In one embodiment, with reference to FIG. 2, the at least one processor 32 can execute the operating system of the vehicle-mounted device 3 and various installed applications (such as the parking position reminder system 30), program codes, etc.

In at least one embodiment, the storage device 31 stores the program code of a computer program, and the at least one processor 32 can call up the program code stored in the storage device 31 to perform related functions. For example, the various modules of the parking position reminding system 30 in FIG. 2 are program codes stored in the storage device 31 and executed by the at least one processor 32, so as to realize the functions of the various modules. The purpose of achieving an indication or reminder as to the parking position (see the description of FIG. 3 below for details) can thus be realized.

In the embodiment, the storage device 31 stores one or more computer readable instructions, and the one or more computer readable instructions are executed by the at least one processor 32 to realize the purpose. Specifically, the specific implementation method of the at least one processor 32 on the above-mentioned computer-readable instructions is given in the following description of FIG. 3.

FIG. 3 is a flowchart depicting an embodiment of a method for indicating a parking position. The method is provided by way of example, as there are a variety of ways to carry out the method. The method is applied to the vehicle-mounted device 3. For the vehicle-mounted device 3, the function for indicating the parking position provided by the method can be directly integrated on the vehicle-mounted device 3, or in the form of a software development kit (SDK) to run on the vehicle-mounted device 3.

The method described below can be carried out using the configurations illustrated in FIGS. 1-2 for example, and various elements of these figures are referenced in explaining the example method. Each block shown in FIG. 3 represents one or more processes, methods, or subroutines, carried out in the example method. Furthermore, the illustrated order of blocks is illustrative only and the order of the blocks can change. Additional blocks can be added or fewer blocks may be utilized, without departing from the present disclosure. The example method can begin at block 301.

At block 311, the obtaining module 301 uses the panoramic lens 34 to obtain a panoramic image of the surroundings of the vehicle 100 when driving.

In the embodiment, the obtaining module 301 captures images of the scene around the vehicle 100 in different orientations through the panoramic lens 34, and forms the panoramic image through image fusion. The panoramic image includes the road at the current location of the vehicle 100 and the surrounding environment.

It can be understood that the road may be an outdoor road or an indoor road. In this embodiment, the obtaining module 301 may acquire a panoramic image of the vehicle 100 at a preset frequency when driving.

At block 312, the identifying module 302 identifies the path of the vehicle 100 based on the panoramic image. The path includes the road from the initial position of the vehicle 100 to the destination and the location at the destination.

In the embodiment, the identifying module 302 identifying the driving path of the vehicle 100 based on the panoramic image includes the following processes:

The identifying module 302 compares the panoramic images with a preset high-precision map. The identifying module 302 can select multiple reference points in the preset high-definition map based on the panoramic images, the multiple reference points including at least the road and the surrounding environment.

When the panoramic image is consistent with the map, the identifying module 302 can determine that the driving path includes a certain road. The coincidence of the panoramic image with the certain road is defined as the coincidence rate of the reference points appearing in the panoramic image reaching or exceeding a preset value, for example, 80%.

At block 313, the identifying module 302 determines whether the vehicle 100 is in a parking or parked position.

In an embodiment, the identifying module 302 determining whether the vehicle 100 is in a parking or parked position includes the following methods.

The identifying module 302 can analyze the panoramic image and identify a car-parking environment or location in a preset area. In the embodiment, the preset area is a parking area, which may be an indoor parking lot or an outdoor parking lot. The preset area includes specific elements indicating that the current area is a parking area, for example, parking instructions or signs, toll gates, etc. When the identifying module 302 analyzes the panoramic image and compares same with the map the preset area, it can determine whether the panoramic image includes some or all of the specific elements.

When the panoramic image is consistent with the preset parking area, the identifying module 302 determines that the vehicle is located at the parking facility. In the embodiment, when the identifying module 302 determines that the panoramic image includes the specific elements, it is determined that the panoramic image is of the preset area, indicating that the vehicle 100 has entered the preset area. The sending module 303 sends the preset area information to the mobile terminal 200. The preset area information includes the name of the parking lot, free parking spaces, and other information.

When the preset area is an indoor parking lot, especially an underground parking lot, the mobile communication network or wireless local area network communication effect may be inoperative, the mobile terminal 200 can be connected to the vehicle 100 via BLUETOOTH.

When the preset area is an outdoor parking lot, the mobile terminal 200 can be connected to the vehicle 100 through a wireless connection such as a mobile communication network, a wireless local area network, or BLUETOOTH.

At block 314, when the vehicle 100 is located at the parking position, the sending module 303 sends parking position information to the mobile terminal.

In the embodiment, the mobile terminal 200 may be a mobile communication device carried by the owner of the vehicle 100, such as a mobile phone. When the mobile terminal 200 is physically approaching the vehicle 100, the sending module 303 can use the BLUETOOTH module 36 to establish communication with the mobile terminal 200, and transmit the route to the mobile terminal 200 at a preset frequency, updating any route which may be stored in the mobile terminal 200. Therefore, the owner of the vehicle 100 can quickly find the vehicle 100 easily, and conveniently and quickly by viewing the route so transmitted.

It can be understood that the method further includes the following processes.

At block a, the identifying module 302 obtains parking space information of the panoramic image. The parking space information includes a parking space code. When the panoramic image does not include a parking space code, the parking space information includes information of the surrounding environment. It can be understood that the step a can be performed when it is detected that the vehicle 100 is ready to be parked (for example, the vehicle 100 is in the parking gear).

It can be understood that the method further includes the following processes.

At block b, the identifying module 302 obtains the direction of driving of the vehicle. Specifically, the identifying module 302 obtains the driving direction of the vehicle through a gyroscope sensor and/or calculated by the panoramic images. It should be noted, the method of the embodiment of the present disclosure may use the panoramic images with a high-precision map to calculate the driving direction of the vehicle.

At block c, the identifying module 302 determines the floor where the vehicle is located according to the panoramic image. It can be understood that the above blocks a, b, and c can be performed between block 313 and block 314. The parking position information includes one or a combination of the parking space information, the floor, and the driving path.

The method can send parking position information to the mobile terminal carried by the owner, and the owner of the vehicle 100 is able to quickly and accurately find the vehicle 100 through the parking space information.

In the several embodiments provided by the present disclosure, it should be understood that the disclosed device and method may be implemented in other ways. For example, the device embodiments described above are only illustrative. For example, the division of the modules is only a logical function division, and there may be other divisions in actual implementation.

The modules described as separate components may or may not be physically separated, and the components displayed as modules may or may not be physical units, that is, they may be located in one place, or they may be distributed on multiple network units. Some or all of the modules can be selected according to actual needs to achieve the purpose of the disclosure.

In addition, the functional modules in the various embodiments of the present disclosure may be integrated into one processing unit, or each unit may exist alone physically, or two or more units may be integrated into one unit. The above-mentioned integrated unit may be implemented in the form of hardware, or may be implemented in the form of hardware plus software functional modules.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:
1. A parking position reminding method comprising:
obtaining panoramic images of a vehicle during driving through a panoramic lens;
identifying a driving path of the vehicle according to the panoramic images;
determining whether the vehicle is at a parking position;
sending parking position information to a mobile terminal when the vehicle is at the parking position;
comparing the panoramic images with an image of a preset area;
determining that the vehicle locates at the parking position when the panoramic image is consistent with the image of the preset area; and
transmitting a route to the mobile terminal at a preset frequency and updating the route stored in the mobile terminal when the mobile terminal is physically approaching the vehicle,
wherein the preset area comprises specific elements indicating that a current area is a parking area, when the panoramic image is determined to include the specific elements, the panoramic image is determined to be consistent with the image of the preset area;

wherein the step of identifying the driving path of the vehicle according to the panoramic images comprises:
comparing the panoramic images with a road image in a preset high-precision map;
selecting multiple reference points in a preset high-definition map based on the panoramic image, wherein the multiple reference points at least comprise a road and a surrounding environment; and
determining the driving path which comprises a road displayed in the road image when a coincidence rate of the reference points appearing in the panoramic image reaches or exceeds a preset value.

2. The parking position reminding method of claim 1, further comprising:
obtaining a driving direction of the vehicle to determine a number of turns of the vehicle;
determining a floor where the vehicle locates according to the number of turns of the vehicle or the panoramic images;
wherein the parking position information comprises the floor.

3. The parking position reminding method of claim 2, wherein the driving direction of the vehicle is obtained through a gyroscope or calculated by the panoramic images.

4. The parking position reminding method of claim 1, wherein the preset area is a parking area, and the mobile terminal connects the vehicle through a wireless connection.

5. The parking position reminding method of claim 1, wherein the parking position information comprises parking space information or the driving path of the vehicle.

6. The parking position reminding method of claim 5, wherein the parking space information comprises a parking space code.

7. The parking position reminding method of claim 1, wherein the parking position information is sent to the mobile terminal via Bluetooth when the vehicle is located at the parking position.

8. A vehicle-mounted device comprising:
a storage device;
at least one processor configured to:
obtain panoramic images of a vehicle during driving through a panoramic lens;
identify a driving path of the vehicle according to the panoramic images;
determine whether the vehicle is at a parking position;
send parking position information to a mobile terminal when the vehicle is at the parking position;
compare the panoramic images with an image of a preset area;
determine that the vehicle locates at the parking position when the panoramic image is consistent with the image of the preset area; and
transmit a route to the mobile terminal at a preset frequency and update the the route stored in the mobile terminal when the mobile terminal is physically approaching the vehicle,
wherein the preset area comprises specific elements indicating that a current area is a parking area, when the panoramic image is determined to include the specific elements, the panoramic image is determined to be consistent with the image of the preset area;
wherein the at least one processor configured to identify the driving path of the vehicle according to the panoramic images comprises:
comparing the panoramic images with a road image in a preset high-precision map;
selecting multiple reference points in a preset high-definition map based on the panoramic image, wherein the multiple reference points at least comprise a road and a surrounding environment; and
determining the driving path which comprises a road displayed in the road image when a coincidence rate of the reference points appearing in the panoramic image reaches or exceeds a preset value.

9. The vehicle-mounted device of claim 8, the at least one processor is further configured to:
obtain a driving direction of the vehicle to determine a number of turns of the vehicle;
determine a floor where the vehicle locates according to the number of turns of the vehicle or the panoramic images;
wherein the parking position information comprises the floor.

10. The vehicle-mounted device of claim 9, wherein the driving direction of the vehicle is obtained through a gyroscope or calculated by the panoramic images.

11. The vehicle-mounted device of claim 8, wherein the preset area is a parking area, and the mobile terminal connects the vehicle through a wireless connection.

12. The vehicle-mounted device of claim 8, wherein the parking position information comprises parking space information or the driving path of the vehicle.

13. The vehicle-mounted device of claim 12, wherein the parking space information comprises a parking space code.

14. The vehicle-mounted device of claim 8, wherein:
the parking position information is sent to the mobile terminal via Bluetooth when the vehicle is located at the parking position.

* * * * *